L. N. WISHMAN.
BREAD PAN.
APPLICATION FILED MAR. 7, 1911.
1,020,004.
Patented Mar. 12, 1912.
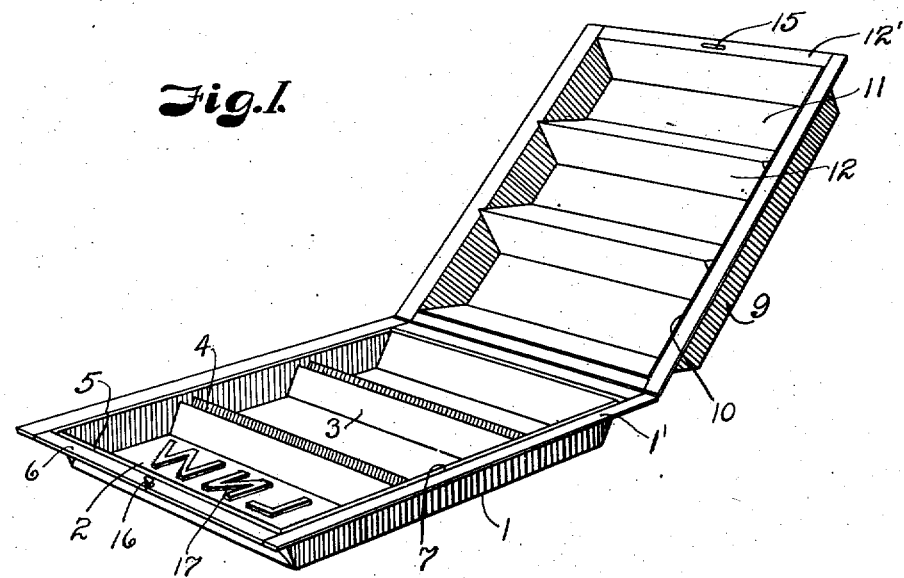
Fig. I.
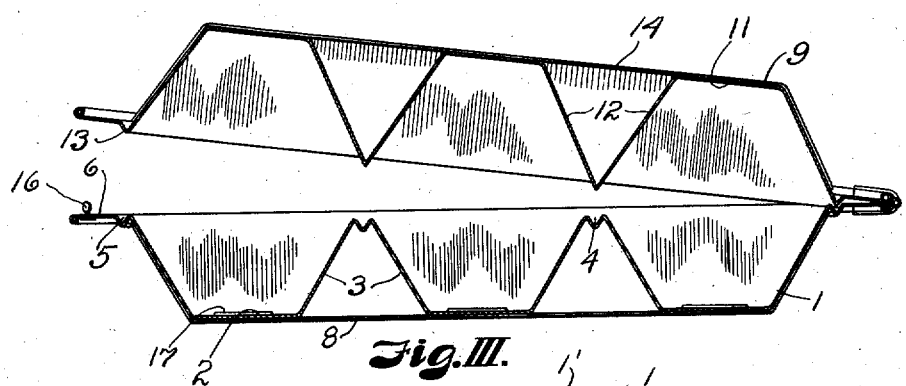
Fig. II.
Fig. III.
WITNESSES:
Arthur U. Caps.
Myrtle M. Jackson.
INVENTOR.
L. N. WISHMAN.
BY
Arthur C. Brown
ATTORNEY.

UNITED STATES PATENT OFFICE.

LOUIS N. WISHMAN, OF KANSAS CITY, MISSOURI.

BREAD-PAN.

1,020,004.

Specification of Letters Patent.   Patented Mar. 12, 1912.

Application filed March 7, 1911.   Serial No. 612,886.

*To all whom it may concern:*

Be it known that I, LOUIS N. WISHMAN, a citizen of the United States, residing at Kansas City, in the county of Jackson and State of Missouri, have invented certain new and useful Improvements in Bread-Pans; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to bread pans and has for its object to provide a pan of that character adapted for containing a number of loaves, and comprising top and bottom members adapted for confining the loaves during the baking process.

It is a further object of my invention to provide a pan wherein the partitions are so arranged and constructed that a maximum baking space is afforded.

It is a further object of my invention to provide means for sealing the two members of the pan, so that rising dough cannot be forced between the pan members.

It is a further object of my invention to provide the top and bottom members of the pan with means for supporting same in an oven, so that the pan bottom will not come in direct contact therewith.

Other objects of my invention are disclosed in the following description, wherein reference is had to the accompanying drawings, in which:—

Figure I is a perspective view of a bread pan constructed according to my invention, shown in open position. Fig. II is a longitudinal vertical section of the pan with the members partially closed. Fig. III is a plan view of the pan taken either from above or below the pan.

Referring more in detail to the parts:—
1 designates one of the pan members which, for convenience, will be designated the lower member, although it is immaterial which member supports the pan in actual use, as both are the same size and are constructed substantially identical on the exterior. The sides of member 1 rise perpendicularly, and between said sides is a bottom 2 which is raised at intervals to provide the compartment partitions 3, said sides rising at an angle of sixty degrees to the base in the construction herein shown, which is a construction for forming loaves hexagonal in cross section. The partitions 3 rise to near the top of the sides 1 and are then turned downwardly so that the partitions of adjacent compartments may form a transverse groove 4, said partitions 3 and the bottom parts 2 being preferably formed from a single piece of sheet metal stamped or otherwise formed to the construction described. The end member 3, which is the end of the pan, is carried up to the level of the sides 1 and is there provided with a groove 5, the outer member of which is extended laterally to form a flange 6. The sides 1 are provided at their upper ends with laterally turned flanges 1' having grooves 7 co-extensive with the grooves 5, and with an under-lap 8 which forms a rib or rail on the under side of the pan bottom for supporting said bottom above the floor of an oven, so that the metal of the floor will not come in direct contact with the metal of the pan when the latter is in use.

9 designates a mating member of the pan, which is provided with sides identical in construction with the sides of the member 1, with the exception that for the upper grooves 7 of member 1, the member 9 has a tongue 10 which is adapted for seating in the groove 7 when the pan is closed.

11 designates the pan top having the partitions 12 which extend at an angle of sixty degrees to the top parts and project beyond the level of the top, the partitions of adjacent compartments meeting in points, which are adapted to seat in the groove 4 of the lower pan member. The end partitions have projecting tongues 13 which are adapted to seat in the end grooves 5 of the base member and assist in sealing the pan when the latter is closed. The sides of the top members are also lapped over to form a rail 14 which corresponds to the rail 8 on the base member. In the flange 12', on the top member 9 is a slot 15, and on the flange 6 is a button 16 which is adapted for projection through the slot 15 and for turning laterally to lock the pan members together. In the bottom 2 or top 14, I provide stenciling 17 which in most cases represents the name of the baker, so that his name may be marked on the loaf baked in the pan.

In using the pan the dough is placed in the separate compartments in the bottom member and the top closed down and fastened. The points of the abutting side partitions in the top member seat in the grooves formed by the partitions in the base member, so as to form separate compartments which, with the partitions extended at the angles described, will be hexagonal in cross section. When the pan is closed, the tongue of the upper member projects into the groove in the bottom member, so that a continuous seal is formed between the two around the pan. When the pan is closed it is placed in the oven and supported on the rails 8, or if inverted on the rails 14, so that the material which directly incloses the dough is not brought in contact with the floor of the oven, thereby obviating burning of the loaf. As the dough is heated it rises in the pan so that it fills the entire compartment and is formed into or around the stenciling on the parts 2 or 11, so that a hexagonal loaf is formed with the imprint of the maker's name thereon.

By forming the compartments in the manner described, considerable space is saved so that advantage may be taken of the entire capacity of an oven and in some cases a pan of this construction, adapted for a certain number of loaves, may be used with ovens wherein pans of ordinary construction could not be used.

While I have described my pan as provided with compartments for baking loaves hexagonal in cross section and prefer to form the pans in that way, I do not wish to be limited to that exact shape, as other shapes may be made and used to equal advantage.

Having thus described my invention, what I claim as new therein and desire to secure by Letters-Patent is:—

1. A bread pan comprising side members and a bottom, and a partition within the pan, the sides of said partition being inclined toward an apex and having a down-set groove in its upper end, and a cover similar to said pan having a partition adapted to seat in said down-set groove, for the purpose set forth.

2. A bread pan comprising a pair of inclosing members, one having a partition provided with inclined sides, the upper end of said partition being below the plane of the open face of the pan and having a longitudinal groove therein, the opposite pan member having a partition, the sides of which are inclined and meet in an apex beyond the plane of the open face of the pan, the apex of one partition being adapted to seat in the groove in the opposite partition, substantially as and for the purpose set forth.

In testimony whereof I affix my signature in presence of witnesses.

LOUIS N. WISHMAN.

Witnesses:
    J. C. BRECKENRIDGE,
    C. B. RUSSELL,
    ARTHUR J. SEIGFREID.